(12) United States Patent
Guo (10) Patent No.: US 7,558,526 B2
(45) Date of Patent: Jul. 7, 2009

(54) METHODS, DEVICES, SYSTEMS AND COMPUTER PROGRAM PRODUCTS FOR PROVIDING INTERACTIVE ACTIVITY PROGRAMS FOR USE WITH PORTABLE ELECTRIC DEVICES

(75) Inventor: Hui Guo, Morrisville, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 586 days.

(21) Appl. No.: 11/198,254

(22) Filed: Aug. 5, 2005

(65) Prior Publication Data

US 2007/0032344 A1    Feb. 8, 2007

(51) Int. Cl.
*H04H 40/00* (2008.01)

(52) U.S. Cl. ............... 455/3.06; 455/41.2; 455/418; 455/419; 482/8; 482/4; 482/1

(58) Field of Classification Search ............... 455/3.06, 455/418, 419, 41.2; 482/8, 4, 1
See application file for complete search history.

(56) References Cited

U.S. PATENT DOCUMENTS

| | | | | |
|---|---|---|---|---|
| 5,308,296 | A * | 5/1994 | Eckstein ................ | 482/5 |
| 5,591,104 | A * | 1/1997 | Andrus et al. .......... | 482/7 |
| 6,012,926 | A * | 1/2000 | Hodges et al. .......... | 434/236 |
| 6,152,856 | A * | 11/2000 | Studor et al. ........... | 482/8 |
| 6,336,891 | B1 * | 1/2002 | Fedrigon et al. ........ | 482/8 |
| 6,672,991 | B2 * | 1/2004 | O'Malley .............. | 482/8 |
| 2002/0160883 | A1 * | 10/2002 | Dugan ................. | 482/8 |
| 2004/0053625 | A1 | 3/2004 | Bye | |
| 2004/0209600 | A1 | 10/2004 | Werner et al. | |
| 2005/0164833 | A1 | 7/2005 | Florio | |
| 2005/0171410 | A1 | 8/2005 | Hjelt et al. | |
| 2007/0197274 | A1 * | 8/2007 | Dugan ................ | 463/7 |
| 2007/0219058 | A1 * | 9/2007 | Fleishman ............ | 482/8 |

FOREIGN PATENT DOCUMENTS

| | | |
|---|---|---|
| DE | 101 60 528 A1 | 6/2003 |
| EP | 0 344 881 A2 | 12/1989 |
| JP | 2000-111828 A | 4/2000 |
| WO | WO 03/079134 | 9/2003 |

OTHER PUBLICATIONS

International Search Report and Written Opinion of the International Searching Authority corresponding to PCT/US2006/008879, mailed Jan. 18, 2007.

Heywow: "Premiere für städtische Vernetzung über Bluetooth, WLAN und GPRS," Jun. 26, 2003. Retrieved from the Internet: http://www.heywow.com/download/heywow_premiere.pdf.

(Continued)

*Primary Examiner*—Matthew D Anderson
*Assistant Examiner*—Minh D Dao
(74) *Attorney, Agent, or Firm*—Myers Bigel Sibley & Sajovec (57) ABSTRACT

Methods, systems, devices and computer program products are provided for providing interactive activity programs to a user of a portable electronic device. The portable electronic device is connected to a data network using a wireless communications network. Interactive activity programs received from the data network are provided to the portable electronic device. The interactive activity programs are associated with geographic locations.

20 Claims, 4 Drawing Sheets

OTHER PUBLICATIONS

Invitation to Pay Additional Fees and Partial International Search Report from the International Searching Authority for International Application No. PCT/US2006/008879, mailed Aug. 7, 2006.

Heywow: "Premiere für städtische Vernetzung über Bluetooth, WLAN und GPRS," Jun. 26, 2003. Retrieved from the Internet: http://www.heywow.com/download/heywow_premiere.pdf.

* cited by examiner

METHODS, DEVICES, SYSTEMS AND COMPUTER PROGRAM PRODUCTS FOR PROVIDING INTERACTIVE ACTIVITY PROGRAMS FOR USE WITH PORTABLE ELECTRIC DEVICES

FIELD OF THE INVENTION

The present invention relates to portable electronic devices and, more particularly, to portable electronic devices capable of communicating with data networks and related methods and computer program products.

BACKGROUND OF THE INVENTION

Recently, there has been a proliferation of features in the field of portable communications. Portable communications devices, such as cordless and cellular telephones, pagers, wireless modems, wireless email devices, personal digital assistants (PDAs) with communication functions, MP3 players and other portable communications devices are becoming more commonplace. Some of these portable communication devices are configured to communicate with a data network, such as the Internet, over the wireless communications network. Thus, users of these portable devices may access the Internet and the information available thereon using the portable communication device. For example, music may be downloaded and stored on the portable communication device or listened to in real time while being downloaded.

SUMMARY OF THE INVENTION

Some embodiments of the present invention provide methods, systems, devices and computer program products for providing interactive activity programs to a user of a portable electronic device. The portable electronic device is connected to a data network using a wireless communications network. Interactive activity programs received from the data network are provided to the portable electronic device. The interactive activity programs are associated with geographic locations.

In further embodiments of the present invention, the interactive activity program may be modified responsive to commands from a user of the portable electronic device. The commands may include voice commands and/or manual commands. In certain embodiments of the present invention, the interactive activity program may be modified responsive to the commands in real time.

In still further embodiments of the present invention, the portable electronic device may be a first portable electronic device. A second portable electronic device may be connected to the data network using the wireless communication network and the interactive activity programs may be simultaneously provided to the first and second portable electronic devices from the data network.

In some embodiments of the present invention, data associated with the user of the portable electronic device may be obtained and a program may be generated for the user based on the obtained data. The interactive activity programs may be associated with an exercise routine of the user. The obtained data may include goals for the exercise routine, routes and/or locations for the exercise routine, distance information associated with exercise sessions of the exercise routine, duration information associated with ones of the exercise sessions, calories burned associated with ones of the exercise sessions and/or journal entries associated with ones of the exercise sessions.

In further embodiments of the present invention, the generated program and/or the obtained data may be stored in the portable electronic device and/or at the data network.

DETAILED DESCRIPTION OF EMBODIMENTS OF THE INVENTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "portable electronic device" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "portable electronic devices" may be portable, transportable, installed in a vehicle (aeronautical, maritime, or land-based), or situated and/or configured to operate locally and/or in a distributed fashion at any other location(s) on earth and/or in space.

As discussed herein with respect to FIGS. 1 through 5, embodiments of the present invention provide methods, devices, systems and computer program products for providing interactive activity programs to a user of one or more portable electronic devices. As used herein "interactive activity programs" refer to programs configured to run on a portable electronic device and provide audio and/or video entertainment and/or education to the user of the portable electronic device. The interactive activity program is associated with a geographic location, for example, London, the mountains, a local walking path or the like.

For example, interactive activity programs according to some embodiments of the present invention may be associated with a user's exercise routine. The interactive activity program may be used to make an exercise routine or sessions thereof more interesting and educational. In particular, an interactive activity program according to some embodiments of the present invention may simulate, for example, a walking path through the Alps. Thus, the user of portable electronic devices according to some embodiments of the present invention may be walking down the street in Raleigh, N.C. but listening to the details of a walking path in the Alps. The user has become a world traveler without ever leaving Raleigh. Some embodiments of the present invention may also provide video clips and images to supplement the audio tour as will be discussed further below. Thus, according to some embodiments of the present invention, portable electronic devices may be used to enhance the user's exercise experience as discussed in detail below with respect to FIGS. 1 through 5.

Figure 1:
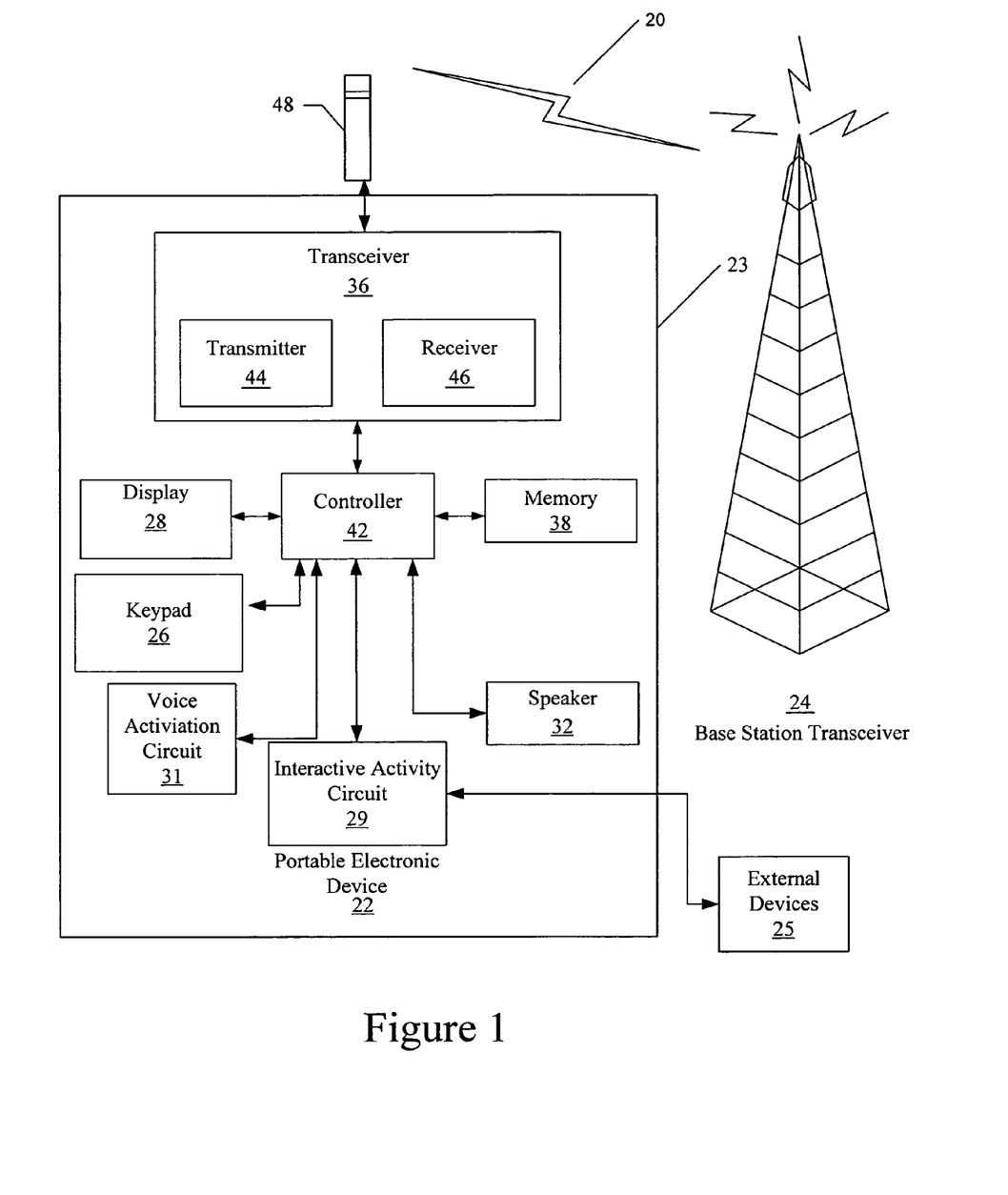
FIG. 1 is a schematic diagram of a portable electronic device according to some embodiments of the present invention and an exemplary base station transceiver.

Referring first to FIG. 1, a schematic block circuit diagram is provided illustrating portable electronic devices 22 including an interactive activity circuit in accordance with some embodiments of the present invention. FIG. 1 illustrates a portable electronic device 22 and a base station transceiver 24 of a wireless communications network 20. It will be understood that as wireless technologies evolve, so do "wireless communication networks." As used herein, a "wireless communication network" may refer to various radio access technologies in the traditional sense, a wireless local area network (LAN) or a wireless personal area network without departing from the teachings of the present invention. These networks may include, for example, radio access technologies, such as Code division multiple access (CDMA), Enhanced Data rates for GSM Evolution (EDGE), General Packet Radio Service (GPRS), Global System for Mobile TeleCommunications (GSM), High-Speed Downlink Packet Access (HSDPA), High-Speed Uplink Packet Access (HSUPA), Universal Mobile Telecommunications System (UMTS), Wideband Code Division Multiple Access (W-CDMA) and/or WCDMA+EDGE (WEDGE) and/or Wireless Local Area Networks (WLAN), such as Wireless Fidelity (WiFi) and Worldwide Interoperability for Microwave Access (WiMAX).

According to some embodiments of the present invention, radio access technologies and/or WLANs may be used as an access media between the portable electronic device 22 and the wireless communication network 20 illustrated in FIG. 1. For example, a portable electronic device 22 may also access a data network via UMTS, GSM, EDGE, GPRS, WEDGE, CDMA, WCDMA, HSDPA, HSUPA, WIFI, WiMAX and the like without departing from the scope of the present invention.

The portable electronic device 22 includes a portable housing 23 and may include, a keyboard 26, a display 28, a speaker 32, a microphone 34, a transceiver 36, and a memory 38, any of which may communicate with a controller (processor) 42. Furthermore, the portable electronic device 22 includes an interactive activity circuit 29 and a voice activation circuit 31 according to some embodiments of the present invention, which also communicate with the processor 42. The processor 42 can be any commercially available or custom microprocessor.

It will be understood that although the interactive activity circuit 29 is illustrated in the portable electronic device 22, embodiments of the present invention are not limited to this configuration. For example, the interactive activity circuit 29 may be provided in a data network or split between the data network and the portable electronic device 22. Furthermore, although the interactive activity circuit 29 and the voice activation circuit 31 are illustrated as separate circuits in FIG. 1, embodiments of the present invention are not limited to this configuration. For example, the interactive activity circuit 29 and the voice activation circuit 31 could be combined without departing from the scope of the present invention.

The transceiver 36 typically includes a transmitter circuit 44 and a receiver circuit 46, which respectively transmit outgoing radio frequency signals to the base station transceiver 24 and receive incoming radio frequency signals, such as voice call and data signals, from the base station transceiver 24 via an antenna 48. The antenna 48 may be an embedded antenna, a retractable antenna or any antenna known to those having skill in the art without departing from the scope of the present invention. The radio frequency signals transmitted between the portable electronic device 22 and the base station transceiver 24 may include both traffic and control signals (e.g., paging signals/messages for incoming calls), which are used to establish and maintain a voice call communication with another party or to transmit and/or receive data, such as e-mail or MMS messages, with a remote device. The processor 42 may support various functions of the portable electronic device 22, including functions related to the interactive activity circuit 29 of the portable electronic device 22 according to some embodiments of the present invention.

In some embodiments of the present invention, the base station transceiver 24 is a radio transceiver(s) that defines a cell in a cellular network and communicates with the portable electronic device 22 and other portable electronic devices in the cell using a radio-link protocol. Although only a single base station transceiver 24 is shown, it will be understood that many base station transceivers may be connected through, for example, a mobile switching center and other devices, to define a wireless communications network.

The transceiver 36 is configured to communicate with a data network using the wireless communications network 20. The interactive program circuit 29 according to embodiments of the present invention is configured to provide interactive activity programs associated with geographic locations to the portable electronic device. The geographic locations may include, for example, London, the Alps, a local walking path or the like. As used herein, "geographic location" refers to both specific geographic locations, such as London, as well as generic geographic locations such as a pool or a park. A user of a portable electronic device 22 including an interactive activity circuit 29 according to some embodiments of the present invention may use the portable electronic device 22 to provide entertainment/education while the user exercises.

This entertainment/education may be provided in the form of audio and/or video. For example, in some embodiments of the present invention the interactive activity program may be a walking tour of London. The user may just listen to descriptions of the London sites as he or she walks on the streets of his or her hometown. In some embodiments of the present invention, the walking tour may be supplemented by video clips and/or images of London. Details with respect to the manner in which the audio and/or video may be delivered will be discussed further below.

Thus, a city walk may present city sites, history, culture cuisine and other amusing facts of the city. A country hike may point out local legends, natural environments such as native plants, exotic birds and featured animals. A cross-country run may point out landmarks, people in the country, the history of the country and current affairs.

The interactive activity programs may be stored on the portable electronic device, on a small external device, for example, a Universal Serial Bus (USB) drive, a Compact-Flash, a Microdrive, a Multi Media Card, a Secure Digital Card, a memory stick and the like, downloaded from the data network in real time, broadcast and the like. In some embodiments of the present invention, the user, may subscribe to a service that may make different interactive activity programs available to the user. This service could operate like, for example, online music stores. The user would pay a monthly fee and have access to multiple interactive activity programs. Thus, if the user got bored of London, they could choose a different city or some other activity.

In some embodiments of the present invention, the interactive activity circuit 29 may be further configured to modify the interactive activity program responsive to commands from a user of the portable electronic device 22. For example, if the interactive activity program is providing a walking tour of London and the tour is progressing down a particular street in London, the user of the portable electronic device may direct the program to take a different street. The user may instruct the interactive activity program using user commands. The user commands may be physically entered into the portable electronic device using a man machine interface (MMI), for example, keypad 26. Furthermore, in some embodiments of the present invention, the portable electronic device 22 may include a voice activation circuit 31. As illustrated in FIG. 1, the voice activation circuit 31 may be connected to the interactive activity program 29 through the controller 42. Thus, in embodiments of the present invention including the voice activation circuit 31, the user may provide the user commands verbally. The commands entered or spoken by the user may modify the interactive activity program in real time. Thus, unlike, for example, books on tape, the user has the ability to modify the interactive activity program on the fly to create a more interesting experience for the user.

It will be understood that the user may have to program a limited number of commands into the portable electronic device so as to allow the voice activation circuit 31 to recognize the user's voice and distinguish the user's voice from other voices as well as background noise. It will be understood that a single portable electronic device 22 may be programmed to recognize the voice of more than one user without departing from the scope of the present invention. Furthermore, although the voice activation circuit 31 is illustrated separate from the interactive activity circuit 29 in FIG. 1, the functionality of these circuits may be combined without departing from the scope of the present invention.

The interactive activity programs can be preprogrammed into the mobile device or customized programs without departing from the scope of the present invention. For example, the interactive activity circuit may be configured to obtain data associated with the user of the mobile device, such as goals, for example, lose weight, learn about mountains, learn about Spain and the like. The interactive activity circuit 29 may be further configured to generate a customized activity program, for example, an exercise routine for the user based on the obtained data. For example, if the user wants to run through Yellowstone Park in 3 weeks, the program may be configured to set up the routes and distances to allow the user to accomplish this goal.

Thus, the interactive activity programs are associated with an exercise routine of the user. In embodiments of the present invention where the interactive activity programs are associated with an exercise routine of the user, the obtained data may include, but is not limited to, goals for the exercise routine, routes and/or locations for the exercise routine, distance information associated with exercise sessions of the exercise routine, duration information associated with ones of the exercise sessions, calories burned associated with ones of the exercise sessions and/or journal entries associated with ones of the exercise sessions. If the user sets a goal and accomplishes the goal, the interactive activity circuit 29 may be configured to provide the user with a prize or souvenir to reward the user for accomplishing his or her goal. In some embodiments of the present invention, the user may also compete with other users by making their information available on the network. The winner of the competition may be awarded a prize.

The generated program and/or the obtained data may be stored in a memory 38 of the portable electronic device 22 and/or at the data network. The memory is associated with the interactive activity program. For example, the user may keep an exercise journal that includes details of his or her particular exercise sessions. The journal entries associated with the most recent sessions may be stored on the portable electronic device 22 and the older entries may be stored at the network so as to free up memory in the portable electronic device 22. The journal entries may be automatically moved from the memory 38 at the portable electronic device to the memory on the network as new entries are added. For example, the latest ten entries may be stored at the portable electronic device 22.

In some embodiments of the present invention, two or more users in geographically distinct locations, for example, on different coasts, may use the same interactive activity program to tour London at the same time. These users may take advantage of the telephone, conference call and/or IP Multimedia subsystem (IMS) features of the portable electronic device to talk to one another while touring London.

In some embodiments of the present invention, the interactive activity programs may also have educational aspects. For example, the tour of Spain may include information related to the history of Spain, the culture, the cuisine and may even include a Spanish lesson. The program is interactive, thus, in some embodiments of the present invention, the interactive activity program is configured to talk, listen and converse with the users. As discussed above, in some embodiments of the present invention, the interactive activity circuit 29 may be configured to communicate with a display and video clips and images may be provided to accompany the audio tour.

In particular, the interactive activity circuit 29 may be coupled to external devices 25, for example, headphones or a display. The headphones may be physically coupled to the portable electronic device. In some embodiments of the present invention, the interactive activity circuit 29 may be configured to include a short-range transceiver, for example, a Bluetooth transceiver, a WIFI transceiver or a ZIGBEE transceiver. In these embodiments of the present invention, the headphones may be configured to communicate with the portable electronic device using the short-range transceiver. Similarly, the display may be physically connected to the portable electronic device 22 or may be communicate with the portable electronic device 22 using the short-range transceiver. In some embodiments of the present invention, the display may be a traditional display or may be integrated with a pair of sunglasses.

In some embodiments of the present invention, the interactive activity circuit 29 may include pedometer or cyclometer functionality. In these embodiments of the present invention, the portable electronic device may track the distance walked, run or cycled by the user. It will be understood that external pedometers and cyclometers may also be used in combination with portable electronic devices 22 according to embodiments of the present invention to provide similar functionality. Some embodiments of the present invention may include a personal trainer feature. For example, when the pedometer and/or cyclometer indicate a goal of the user has been reached, the Multimedia Messaging Service (MMS) or the Short Message Service (SMS) message may be sent to the user encouraging the user and congratulating him or her.

It will be understood that although some embodiments of the present invention are discussed herein as being used when the user is walking, running or cycling, embodiments of the present invention are not limited to this configuration. For example, if the portable electronic device were waterproof, interactive activity circuits may be used to simulate swimming in the ocean and the audio portion of the program could describe the fish and plants therein. Furthermore, the interactive activity circuit 29 according to some embodiments of the present invention may also be used to simulate sports events, for example, the New York Marathon, the Tour de France and the like without departing from the scope of the present invention.

Figure 2:
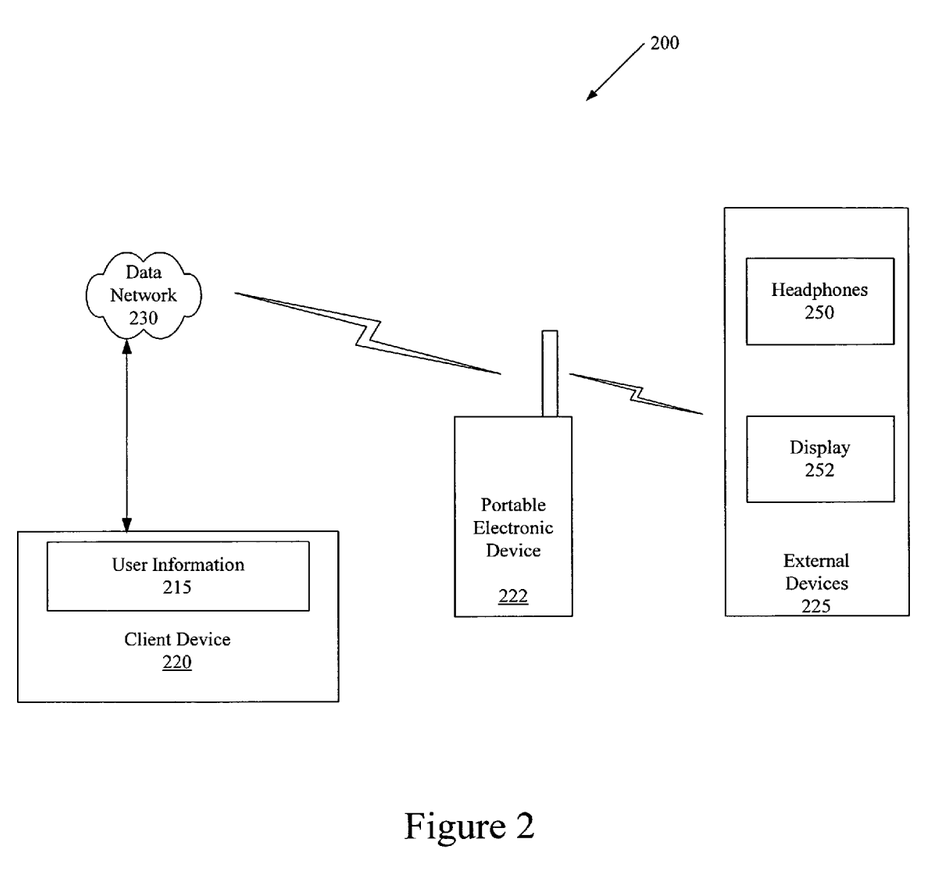
FIG. 2 is a schematic illustration of systems including interactive activity circuits according to some embodiments of the present invention.

Referring now to FIG. 2, a system including a portable electronic device according to some embodiments of the present invention will be discussed. As illustrated in FIG. 2, the system 200 includes a portable electronic device 222, a data network 230, a client device 220 that stores user information 215 and external devices 225, for example, headphones 250 and a display 252. It will be understood that one or more of the elements of the system may be omitted without departing from the scope of the present invention. For example, the system 200 could operate very well without the display 252.

The portable electronic device 222 may be a portable electronic device including the interactive activity circuit 29 as discussed with respect to FIG. 1. The portable electronic device 222 communicates with the data network 230 over the wireless communications system. The display 252 may be physically coupled to the portable electronic device or coupled using a short-range transceiver, such as Bluetooth, WIFI or ZIGBEE. The display 252 may be configured to provide visual clips and/or images to enhance the audio tour of, for example, London. In some embodiments of the present invention, the display 252 may be integrated with a pair of translucent sunglasses so as to allow the video clips and/or images to be seen while exercising outside the home, i.e. not on a treadmill in front of a television. It will be understood that the images may also be displayed on a traditional terminal for those that exercise on, for example, a treadmill.

The headphones 250 may also be physically coupled to the portable electronic device 222 or coupled using a short-range transceiver. It will be understood that the headphones 250 are not a necessary aspect of the present invention. For example, the user could listen to the audio tour of London through the speaker 32 (FIG. 1) already present on the portable electronic device 222. However, the headphones 250 may make the information easier to hear by, for example, shielding the signal from background noise.

As discussed above, user information may be stored at the network 230 to conserve space on the portable electronic device. For example, the user information 215 may be stored on a client device 220 coupled to the network 230. The user information may include, but is not limited to goals for the exercise routine, routes and/or locations for the exercise routine, distance information associated with exercise sessions of the exercise routine, duration information associated with ones of the exercise sessions, calories burned associated with ones of the exercise sessions and/or journal entries associated with ones of the exercise sessions.

Figure 3:
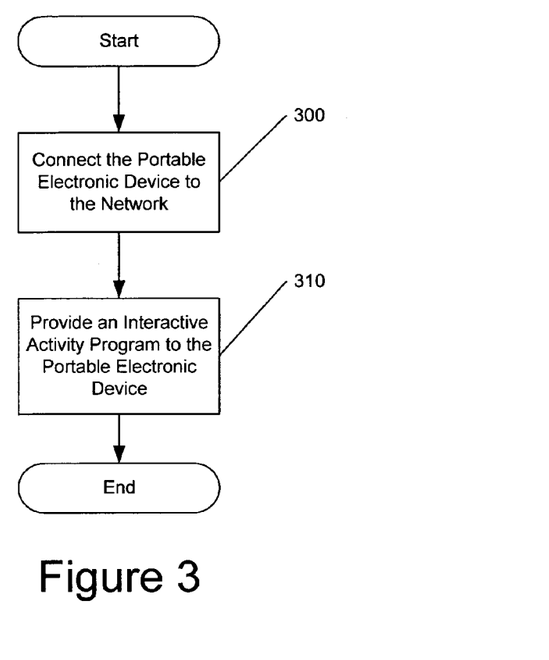
FIGS. 3 through 5 are flowcharts illustrating operations of portable electronic devices according to various embodiments of the present invention.

Operations of portable electronic devices according to some embodiments of the present invention will now be discussed with respect to FIGS. 3 through 5. Referring now to FIG. 3, operations begin at block 300 by connecting the portable electronic device to a data network using a wireless communications network. Interactive activity programs received from the data network may be provided to the portable electronic device (block 310). As discussed above, the interactive activity programs are associated with geographic locations, for example, city streets, Spain, New York City and the like. The interactive activity program may be provided using audio and/or video according to some embodiments of the present invention.

The audio may be provided using the speaker already provided in the portable electronic device or in some embodiments the user may use headphones. The headphones may be directly plugged into the portable electronic device or they may communicate with the portable electronic device using a short-range transceiver, for example, Bluetooth, WIFI or ZIGBEE. Similarly, the display for the video images, for example, video clips and images of the geographic location may be directly coupled to the portable electronic device or may communicate with the portable electronic device using a short-range transceiver. The display may be a traditional display for those exercising on stationary equipment or may be integrated, for example, into a pair of sunglasses for those who exercise outside.

Figure 4:
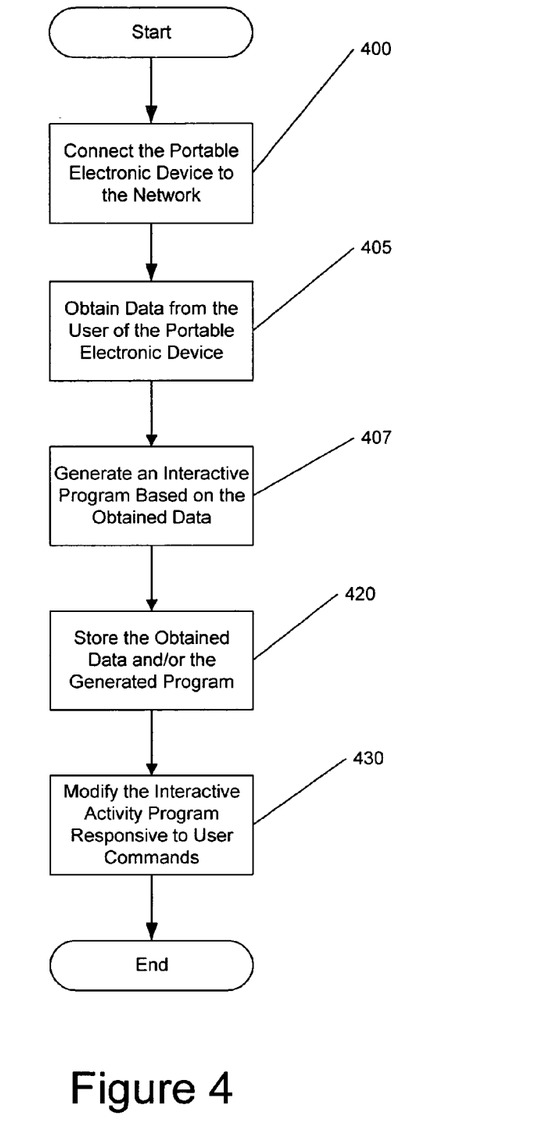

Referring now to FIG. 4, operations for providing interactive activity programs to a user of a portable electronic device according to further embodiments of the present invention will be discussed. Operations begin at block 400 by connecting the portable electronic device to a data network using a wireless communications network. Information is obtained from the user (block 405). For example, the user information may include fitness goals, duration of the exercise, types of locations the user is interested in learning about and the like. An interactive activity program may be generated based on the user information obtained. (block 407). For example, if the user likes cities in the United States and walking for a distance of about five miles for a duration of three weeks, a walking tour of Los Angeles may be generated in five mile blocks for twenty-one days. It will be understood that default programs may also be provided such that the user may select an existing interactive activity program. The obtained user information and/or generated program may be stored at the portable electronic device or on the network to save memory in the portable electronic device (block 420).

In some embodiments of the present invention, the interactive activity programs are associated with an exercise routine of the user. In these embodiments of the present invention, the user information/obtained data may include goals for the exercise routine, routes and/or locations for the exercise routine, distance information associated with exercise sessions of the exercise routine, duration information associated with ones of the exercise sessions, calories burned associated with ones of the exercise sessions and/or journal entries associated with ones of the exercise sessions.

Once the user starts the generated interactive activity program, for example, the walking tour of Los Angeles, the generated interactive activity program may be modified based on user commands (block 430). For example, if the tour is proceeding down a particular street in Los Angeles, the user may divert the tour to another street by issuing commands. These commands may be entered on a user input device associated with the portable electronic device, for example, a keypad, or these commands may be verbal. For example, the portable electronic device may be equipped with a voice recognition circuit, which may be configured to recognize the users voice and certain commands.

Figure 5:
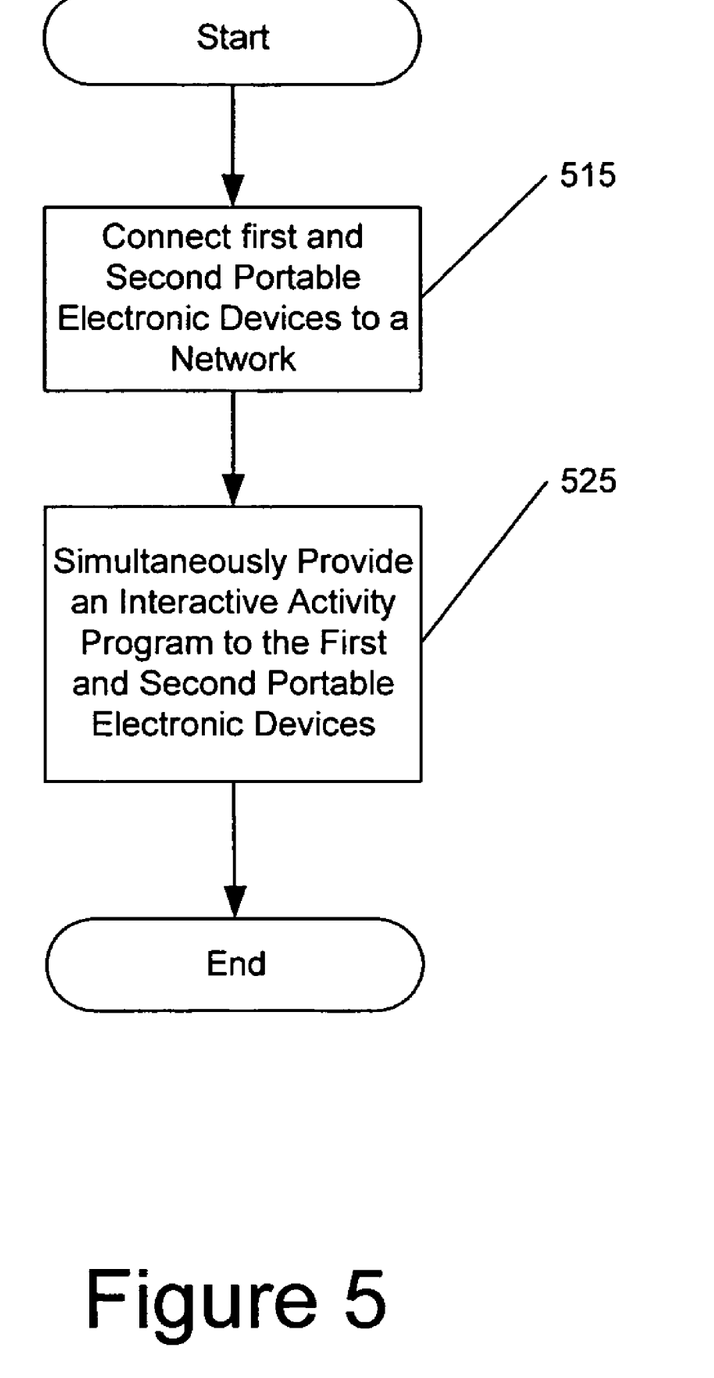

Referring now to FIG. 5, operations according to further embodiments of the present invention will be discussed. Operations begin at block 515 by connecting first and second portable electronic devices to the data network using the wireless communication network. An interactive activity program may be provided to the first and second portable electronic devices from the data network simultaneously (block 545). Thus, according to some embodiments of the present invention, two or more users in different locations can use the same interactive activity program at the same time. Teleconferencing functions of the portable electronic device may be used to allow the users to talk to one another as they, for example, all walk the streets of London together. Thus, two sisters on different coasts may exercise together while learning about London according to some embodiments of the present invention.

As will be appreciated by one of skill in the art, the present invention may be embodied as a method, device, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams of FIGS. 2 through 4 illustrate the architecture, functionality, and operations of some embodiments of methods, systems, and computer program products for supplementing game resources using a portable electronic device. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A portable electronic device, comprising:
    a transceiver configured to communicate with a data network using a wireless network; and
    an interactive program circuit configured to provide interactive activity programs received from the data network to the portable electronic device, the interactive activity programs being associated with geographic locations,
    wherein the interactive program circuit is further configured to:
    obtain data associated with a user of the portable electronic device; and
    generate a program for the user based on the obtained data; and
    wherein the interactive activity programs are associated with an exercise routine of the user and wherein the obtained data comprises goals for the exercise routine, routes and/or locations for the exercise routine, distance information associated with exercise sessions of the exercise routine, duration information associated with ones of the exercise sessions, calories burned associated with ones of the exercise sessions and/or journal entries associated with ones of the exercise sessions.

2. The portable electronic device of claim 1, wherein the interactive program circuit is further configured to modify the interactive activity program responsive to commands from a user of the portable electronic device.

3. The portable electronic device of claim 2, wherein the commands comprise voice commands and/or manual commands and wherein the interactive program circuit is further configured to modify the interactive program responsive to the commands in real time.

4. The portable electronic device of claim 1 wherein the generated program and/or the obtained data are stored in a memory in the portable electronic device and/or at the data network, the memory being associated with the interactive activity program.

5. The portable electronic device of claim 1, wherein the interactive program circuit is further configured to provide audio and/or video educational and/or entertainment interactive activity programs associated with geographic locations.

6. A method of providing interactive activity programs to a user of a portable electronic device, comprising:
   connecting the portable electronic device to a data network using a wireless communications network; and
   providing interactive activity programs received from the data network to the portable electronic device, the interactive activity programs being associated with geographic locations,
   wherein providing interactive activity programs comprises:
   obtaining data associated with the user of the portable electronic device; and
   generating a program for the user based on the obtained data;
   wherein the interactive activity programs are associated with an exercise routine of the user and wherein the obtained data comprises goals for the exercise routine, routes and/or locations for the exercise routine, distance information associated with exercise sessions of the exercise routine, duration information associated with ones of the exercise sessions, calories burned associated with ones of the exercise sessions and/or journal entries associated with ones of the exercise sessions.

7. The method of claim 6, further comprising modifying the interactive activity program responsive to commands from a user of the portable electronic device.

8. The method of claim 7, wherein the commands comprise voice commands and/or manual commands and wherein modifying comprises modifying the interactive activity program responsive to the commands in real time.

9. The method of claim 6, wherein the portable electronic device comprises a first portable electronic device, the method further comprising:
   connecting at least a second portable electronic device to the data network using the wireless communication network; and
   simultaneously providing the interactive activity programs to the first and the at least a second portable electronic devices from the data network.

10. The method of claim 6 further comprising storing the generated program and/or the obtained data in the portable electronic device and/or at the data network.

11. The method of claim 6, carried out by a computer program product embodied in a computer readable medium.

12. A system for providing interactive activity programs to a user of a portable electronic device, comprising:
   a wireless communication network;
   a data network communicatively connected to the wireless communication network;
   a portable electronic device configured to connect to the data network through the wireless communications network; and
   an interactive activity circuit in the portable electronic device configured to provide interactive activity programs received from the data network to the portable electronic device, the interactive activity programs being associated with geographic locations,
   wherein the interactive activity circuit is further configured to obtain data associated with the user of the portable electronic device and generate a program for the user based on the obtained data; and
   wherein the interactive activity programs are associated with an exercise routine of the user and wherein the obtained data comprises goals for the exercise routine, routes and/or locations for the exercise routine, distance information associated with exercise sessions of the exercise routine, duration information associated with ones of the exercise sessions, calories burned associated with ones of the exercise sessions and/or journal entries associated with ones of the exercise sessions.

13. The system of claim 12, wherein the interactivity circuit is further configured to modify the interactive program responsive to commands from a user of the portable electronic device.

14. The system of claim 13, wherein the commands comprise voice commands and/or manual commands and wherein the interactivity circuit is further configured to modify the interactive activity program responsive to the commands in real time.

15. The system of claim 12, further comprising a memory coupled to the portable electronic device and/or the data network, the memory being configured to store the generated program and/or the obtained data in the portable electronic device and/or at the data network.

16. The system of claim 12, further comprising a display coupled to the portable electronic device and configured to illustrate video clips and/or images associated with the interactive activity program.

17. The system of claim 16, wherein the display is integrated in a pair of glasses configured to be worn by the user.

18. The system of claim 16, wherein the display is wirelessly coupled to the portable electronic device using WIFI, Bluetooth and/or ZIGBEE.

19. The system of claim 12 further comprising a pair of headphones coupled to the portable electronic device and configured to communicate audio signals associated with the interactive activity program.

20. The system of claim 19, wherein the headphones are wirelessly coupled to the portable electronic device using WIFI, Bluetooth and/or ZIGBEE.

* * * * *